J. G. STOKES.
EXTRACTOR APPLIANCE FOR AUTOMOBILE WHEELS.
APPLICATION FILED APR. 30, 1921.

1,431,338. Patented Oct. 10, 1922.

Inventor
James G. Stokes
W. H. Hill
By
Attorney

Patented Oct. 10, 1922.

1,431,338

UNITED STATES PATENT OFFICE.

JAMES G. STOKES, OF BURGAW, NORTH CAROLINA.

EXTRACTOR APPLIANCE FOR AUTOMOBILE WHEELS.

Application filed April 30, 1921. Serial No. 465,822.

*To all whom it may concern:*

Be it known that I, JAMES G. STOKES, a citizen of the United States, residing at Burgaw, in the county of Pender and State of North Carolina, have invented certain new and useful Improvements in Extractor Appliances for Automobile Wheels, of which the following is a specification.

This invention relates to automobile wheel attachments for pulling or extracting automobiles from stalled or foundered position or condition occasioned by reason of a wheel or wheels becoming fast bound in mud, ruts or other road defects.

The object of the invention is to provide a novel and peculiar device attachable to an automobile wheel and having members projecting from the wheel tread or tire, said members forming road or tractor projections and guide sleeves for an anchored chain or cable attached to the stalled wheel.

A further object of the invention is to provide an automobile wheel attachment for stalled wheels which shall be of such novel and peculiar construction as to be expeditiously applied to and removed from the wheel as desired or as occasion may demand without employing tools or implements, and which shall be of such resilient character as to be sprung into and out of position, and which shall afford tread projections forming guide sheaves for an anchored cable attached to the wheel.

Various other objects, advantages and improved results are attainable in the manufacture and practical application of the invention.

In the accompanying drawings forming part of this application:

The same reference characters denote the same parts throughout the several views of the drawings.

Figure 1:
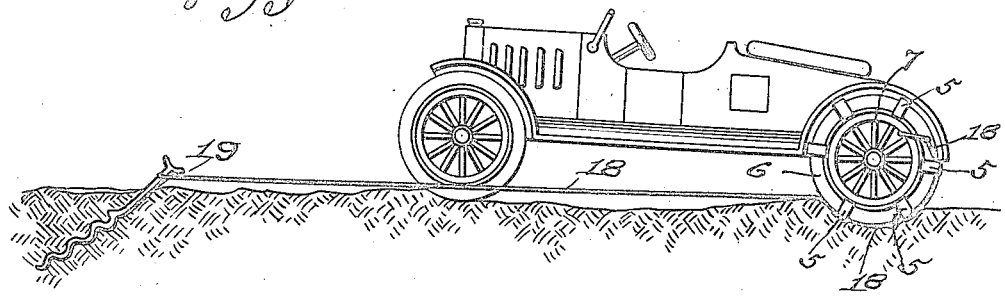
Fig. 1 is a side elevation of an automobile, showing the application of the invention to a stalled wheel.
Figure 2:
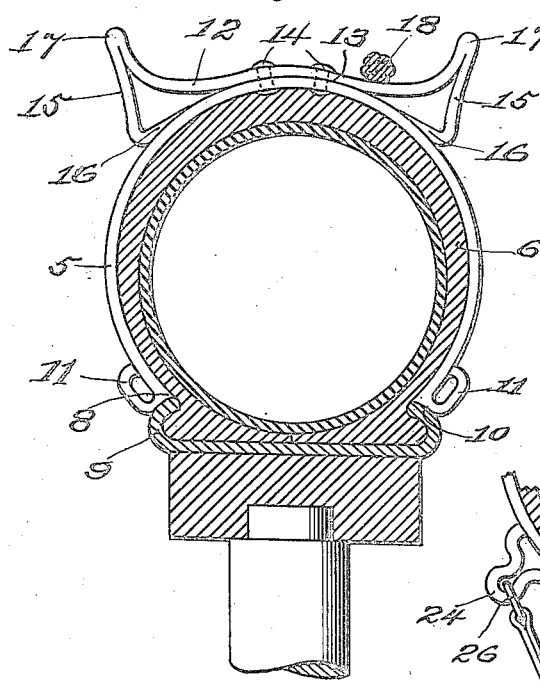
Fig. 2 is a cross section of a wheel, showing one of the devices attached thereto.
Figure 3:
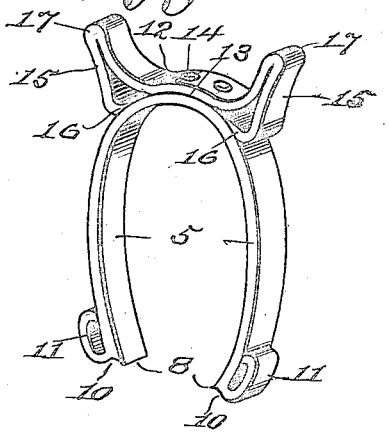
Fig. 3 is a detailed perspective view of one of the devices.

In carrying out my invention, I employ a plurality of bands or clips as 5, composed of spring metal of sufficient resiliency to be sprung over the tire as 6 of an automobile or truck wheel as 7. All of these bands or clips being of the same construction, only one of them will be described herein in detail.

The band or clip consists of a comparatively narrow plate of spring steel or other suitable metal and of sufficient thickness as to prevent accidental bending or fracture under ordinary usage, yet permitting the band to be sprung into and out of position on a wheel tire. Each of the free ends of the band has an inwardly projecting pointed or beveled edge 8 which fits the outer periphery of the tire rim 9 at the juncture of the latter and the tire 6, and said ends have a rim bearing surface 10, and a loop 11 projecting from the outer face of the band adjacent to said ends.

Each band is provided with a tread device composed of metal of the same width as the bands and comprising a main plate 12, the under or inner face of which is grooved or concaved centrally as at 13 to conform with the outer face of the bands, and the plate member 12 is secured to the bands as by rivets 14 extending through the concaved portion of said plate and the bands. The inner head of the rivets being depressed into the tire surface assists in centralizing and holding the bands after the bands have been sprung into position on the tire. The plate-member 12 is preferably of spring-steel and has legs or brace-members 15 branching off from its ends and said legs are preferably substantially concavo-convex and have flattened inturned feet-forming members 16 fitting the bands 5. The metal forming the plate 12 and the legs 15 is of enlarged thickness from the intersection of the legs and plate, and such thickened portions project outwardly from the plate and radially from the tire in off-set position relative to the central periphery of the tire so as to form tread heels or members 17, and the outer faces of these members are concaved or curved into the outer face of the plate member 12 so as to form a guide sheave for a suitable chain or rope 18 having one end anchored as at 19 and the other end removably secured to the wheel between the spokes so as to ride against one of the spokes in a wheel extracting operation.

This off-set position of the tread ends of the plate 12, causes said ends to tread at each side of the tire tread and thereby lift the tire out of a rut or stalled position.

Figure 4:
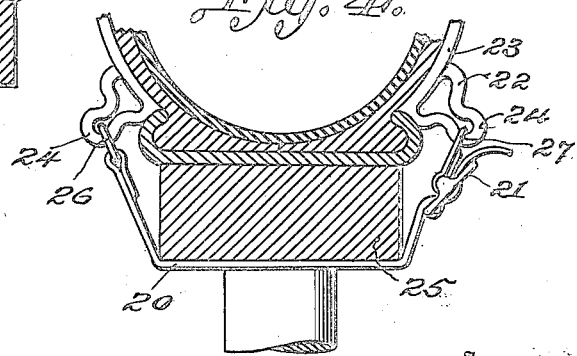
Fig. 4 is a cross section of part of a wheel, showing a strap attachment.

Obviously the bands hug or impinge the tire under their spring tension and the ends of the bands have such engagement with the tire rim as to prevent displacement of the bands in a chain pulling operation. But as a precaution, I have devised a metal tie strap 20 and buckle 21, as shown in Fig. 4 of the drawings. The piece 22 of the band 23 has a loop 24, and one end of the strap which extends under the felly 25 is connected with one of the loops 24 by a link 26, and the buckle is connected with the other loop by a link 27.

Obviously when a wheel or wheels become stalled by reason of mud or other objectionable or interfering road surface, the bands are sprung into position, the anchored rope is attached and the engine started for forward movement, whereupon the stalled wheel will be pulled out of the rut or mud, and during turning movement of the wheel, the rope is wound upon one or more of the guide sheaves until the wheel is extracted.

It will be understood that the bands may be made in various sizes, and a wheel may not be fully equipped with the bands, but only a sufficient number of the bands may be used as occasion may demand.

Having thus described my invention what I claim as new and desire to secure by Letters Patent is:

1. In an extractor appliance for automobile wheels, a plurality of resilient bands fitting the wheel tire, a device secured to each of the bands and forming a sheave and tread projections off-set from the central periphery of the tire, and means attached to the wheel and windable on the sheave for extracting the wheel.

2. An extractor appliance of the type described, including a resilient clip adapted to transversely engage the tire and rim of a wheel, a winding cable and a member attached to said clip, having tractor or tread-like functioning end-extensions, and contoured for receiving said winding cable in effecting the extricating operation.

3. An extractor appliance for vehicle wheels, including a multiple of resilient clips adapted to transversely engage the wheel-tire and rim, a winding cable and a plurality of concavo-convex members having traction or tread-like functioning end-extensions and secured to said resilient clips and contoured for receiving said winding cable in effecting the extricating operation.

In witness whereof I hereunto set my hand in the presence of two witnesses.

JAMES G. STOKES.

Witnesses:
HENRY L. JOHNSON,
LINWOOD MURRAY.